US012763000B2

(12) United States Patent
Kim et al.

(10) Patent No.: US 12,763,000 B2
(45) Date of Patent: Oct. 13, 2026

(54) TIMING CONTROLLER AND DISPLAY DEVICE INCLUDING THE SAME

(71) Applicant: SAMSUNG DISPLAY CO., LTD., Yongin-si (KR)

(72) Inventors: Jin Seuk Kim, Yongin-si (KR); Seok Hoon Yoon, Yongin-si (KR); Jong Heon Han, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 20 days.

(21) Appl. No.: 18/938,550

(22) Filed: Nov. 6, 2024

(65) Prior Publication Data

US 2025/0292723 A1 Sep. 18, 2025

(30) Foreign Application Priority Data

Mar. 13, 2024 (KR) ........................ 10-2024-0035058

(51) Int. Cl.
*G09G 3/32* (2016.01)
*G09G 3/3275* (2016.01)

(52) U.S. Cl.
CPC ............. *G09G 3/32* (2013.01); *G09G 3/3275* (2013.01); *G09G 2300/0426* (2013.01); *G09G 2310/08* (2013.01)

(58) Field of Classification Search
CPC .......... G09G 3/20; G09G 3/32; G09G 3/3208; G09G 3/3266; G09G 3/3275; G09G 2300/04; G09G 2300/0426; G09G 2310/0243; G09G 2310/0264; G09G 2310/08; H10K 59/131
See application file for complete search history.

(56) References Cited

U.S. PATENT DOCUMENTS 10,403,689 B2 9/2019 Park et al.
2009/0146940 A1* 6/2009 Kang .................. G09G 3/3688 345/87
2018/0284926 A1* 10/2018 Kim ...................... G06F 3/0416

FOREIGN PATENT DOCUMENTS

KR 10-2423681 B1 7/2022

* cited by examiner

*Primary Examiner* — Nelson M Rosario
(74) *Attorney, Agent, or Firm* — F. Chau & Associaties, LLC

(57) ABSTRACT

A timing controller includes a control signal generator configured to generate a plurality of control signals, an output pad unit including a plurality of output pads for outputting the plurality of control signals to an outside of the timing controller, wherein the plurality of output pads are grouped into a plurality of sub pad groups and each of the plurality of sub pad groups includes P output pads, and wherein P represents a number of output pads in each of the plurality of sub pad groups and the P output pads are electrically connected with each other, and a plurality of transmission lines connecting the output pad unit to the control signal generator. The P output pads are adjacent to each other in a first direction, and the output pad unit is spaced apart from the control signal generator in a second direction crossing the first direction.

20 Claims, 10 Drawing Sheets

TIMING CONTROLLER AND DISPLAY DEVICE INCLUDING THE SAME

This application claims priority to Korean Patent Application No. 10-2024-0035058, filed on Mar. 13, 2024, and all the benefits accruing therefrom under 35 U.S.C. § 119, the content of which in its entirety is herein incorporated by reference.

BACKGROUND

1. Field

The disclosure relates to a timing controller and a display device including the same.

2. Description of the Related Art

A timing controller may supply control signals to a display panel through pads. When a voltage difference between adjacent pads is large, a strong electric field may be generated between the adjacent pads, and thus a charge may move. Accordingly, corrosion of the pads may occur. Since the corrosion occurring in the pads may cause a resistance increase, a disconnection, a short circuit, a bonding defect, or the like, the corrosion may be a reason that reduces reliability of the display device.

The content described above is only intended to help understanding of the background technology of the technical ideas of the disclosure, and therefore, it cannot be understood as a content corresponding to prior art known to those skilled in the art of the disclosure.

SUMMARY

Embodiments of the disclosure are to minimize corrosion of pads included in a timing controller. More specifically, embodiments of the disclosure are to minimize corrosion of the pads by alleviating a voltage difference between adjacent pads of the timing controller.

According to an aspect of the present disclosure, a timing controller includes a control signal generator configured to generate a plurality of control signals, an output pad unit including a plurality of output pads for outputting the plurality of control signals to an outside of the timing controller, wherein the plurality of output pads are grouped into a plurality of sub pad groups and each of the plurality of sub pad groups includes P output pads, and wherein P represents a number of output pads in each of the plurality of sub pad groups and the P output pads are electrically connected with each other, and a plurality of transmission lines connecting the output pad unit to the control signal generator. The P output pads are adjacent to each other in a first direction, and the output pad unit is spaced apart from the control signal generator in a second direction crossing the first direction.

Each of the plurality of output pads included in the output pad unit may have a first length in the first direction and a second length in the second direction. The second length is longer than the first length.

The plurality of output pads included in the output pad unit are arranged in a plurality of rows and a plurality of columns. Each of the plurality of rows extends in the first direction, and the plurality of rows are spaced apart from each other in the second direction. Each of the plurality of columns extends in the second direction, and the plurality of columns are spaced apart from each other in the first direction. Output pads in each of the plurality of rows are spaced apart from each other in the first direction by a third length. Output pads in each of the plurality of columns are spaced apart from each other in the second direction by a fourth length longer than the third length.

The output pad unit may further include a plurality of dummy pads that do not output the control signals to the outside.

Each of the plurality of sub pad groups may be connected to the control signal generator through a corresponding one of the plurality of transmission lines.

The plurality of sub pad groups include a first sub pad group and a second sub pad group. The first sub pad group and the second sub pad group are adjacent to each other in the second direction. The plurality of transmission lines include a first transmission line connected to the first sub pad group and a second transmission line connected to the second sub pad group. At least a portion of the first transmission line overlaps the second transmission line in a third direction perpendicular to the first and second directions.

The first sub pad group outputs a first control signal among the plurality of control signals to the outside of the timing controller through the first transmission line, the second sub pad group outputs a second control signal among the plurality of control signals to the outside of the timing controller through the second transmission line, and the second control signal is different from the first control signal.

According to an aspect of the present disclosure, a display device includes a plurality of pixels connected to a plurality of gate lines, a gate driver configured to supply a plurality of gate signals to the plurality of pixels through the plurality of gate lines, a plurality of gate pads configured to transmit a plurality of control signals to the gate driver through a plurality of control lines, and a timing controller configured to supply the plurality of control signals to the plurality of gate pads. The timing controller includes a control signal generator configured to generate the plurality of control signals, an output pad unit including a plurality of output pads for outputting the plurality of control signals to an outside of the timing controller, wherein the plurality of output pads are grouped into a plurality of sub pad groups and each of the plurality of sub pad groups includes P output pads, and wherein P represents a number of output pads in each of the plurality of sub pad groups and the P output pads are electrically connected with each other, and a plurality of transmission lines connecting the output pad unit to the control signal generator. The P output pads are adjacent to each other in a first direction, and the output pad unit is spaced apart from the control signal generator in a second direction crossing the first direction.

Each of the plurality of output pads included in the output pad unit may have a first length in the first direction and a second length in the second direction. The second length is longer than the first length.

The plurality of output pads included in the output pad unit are arranged in a plurality of rows and a plurality of columns. Each of the plurality of rows extends in the first direction, and the plurality of rows are spaced apart from each other in the second direction. Each of the plurality of columns extends in the second direction, and the plurality of columns are spaced apart from each other in the first direction. Output pads in each of the plurality of rows are spaced apart from each other in the first direction by a third length. Output pads in each of the plurality of columns are spaced apart from each other in the second direction by a fourth length longer than the third length.

The output pad unit may further include a plurality of dummy pads that do not output the control signals to an outside.

Each of the plurality of sub pad groups may be connected to the control signal generator through a corresponding one of the plurality of transmission lines.

The plurality of sub pad groups include a first sub pad group and a second sub pad group. The first sub pad group and the second sub pad group are adjacent to each other in the second direction. The plurality of transmission lines include a first transmission line connected to the first sub pad group and a second transmission line connected to the second sub pad group. At least a portion of the first transmission line overlaps the second transmission line in a third direction perpendicular to the first and second directions.

The first sub pad group outputs a first control signal among the plurality of control signals to the outside of the timing controller through the first transmission line, the second sub pad group outputs a second control signal among the plurality of control signals to the outside of the timing controller through the second transmission line, and the second control signal is different from the first control signal.

According to an aspect of the present disclosure, a timing controller includes a control signal generator configured to generate a plurality of control signals, an output pad unit including a plurality of output pads for outputting the plurality of control signals to an outside of the timing controller, wherein the plurality of output pads are grouped into a plurality of sub pad groups arranged in a plurality of rows and a plurality of columns and each of the plurality of sub pad groups includes P output pads, and wherein P represents a number of output pads in each of the plurality of sub pad groups and the P output pads are electrically connected with each other, and a plurality of transmission lines, each of the plurality of transmission lines connecting a corresponding one of the plurality of sub pad groups to the control signal generator. The P output pads are adjacent to each other in a first direction, and the output pad unit is spaced apart from the control signal generator in a second direction crossing the first direction. Each of the plurality of rows extends in the first direction, and the plurality of rows are spaced apart from each other in the second direction. Each of the plurality of columns extend in the second direction, and the plurality of columns are spaced apart from each other in the first direction.

The P may be three.

Each of the plurality of sub pad groups is consisted of a first output pad, a second output pad, and a third output pad that are spaced apart from each other in the first direction and connected with each other. The second output pad is disposed between the first output pad and the third output pad.

Each of the plurality of transmission lines includes a first portion connected to a first output pad of a corresponding one of the plurality of sub pad groups, two second portions connecting the first output pad to the second output pad and the third output pad to the second output pad, respectively, and a third portion which is electrically connected to a gate pad of a display panel.

Each of the plurality of output pads included in the output pad unit has a first length in the first direction and a second length in the second direction. The second length is longer than the first length.

Output pads in each of the plurality of rows are spaced apart from each other in the first direction by a third length. Output pads in each of the plurality of columns are spaced apart from each other in the second direction by a fourth length longer than the third length.

According to embodiments of the disclosure, corrosion of pads included in a timing controller may be minimized. More specifically, corrosion of the pads may be minimized by alleviating a voltage difference between adjacent pads of the timing controller.

An effect according to embodiments is not limited to the contents exemplified above, and further various effects are included in the present specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
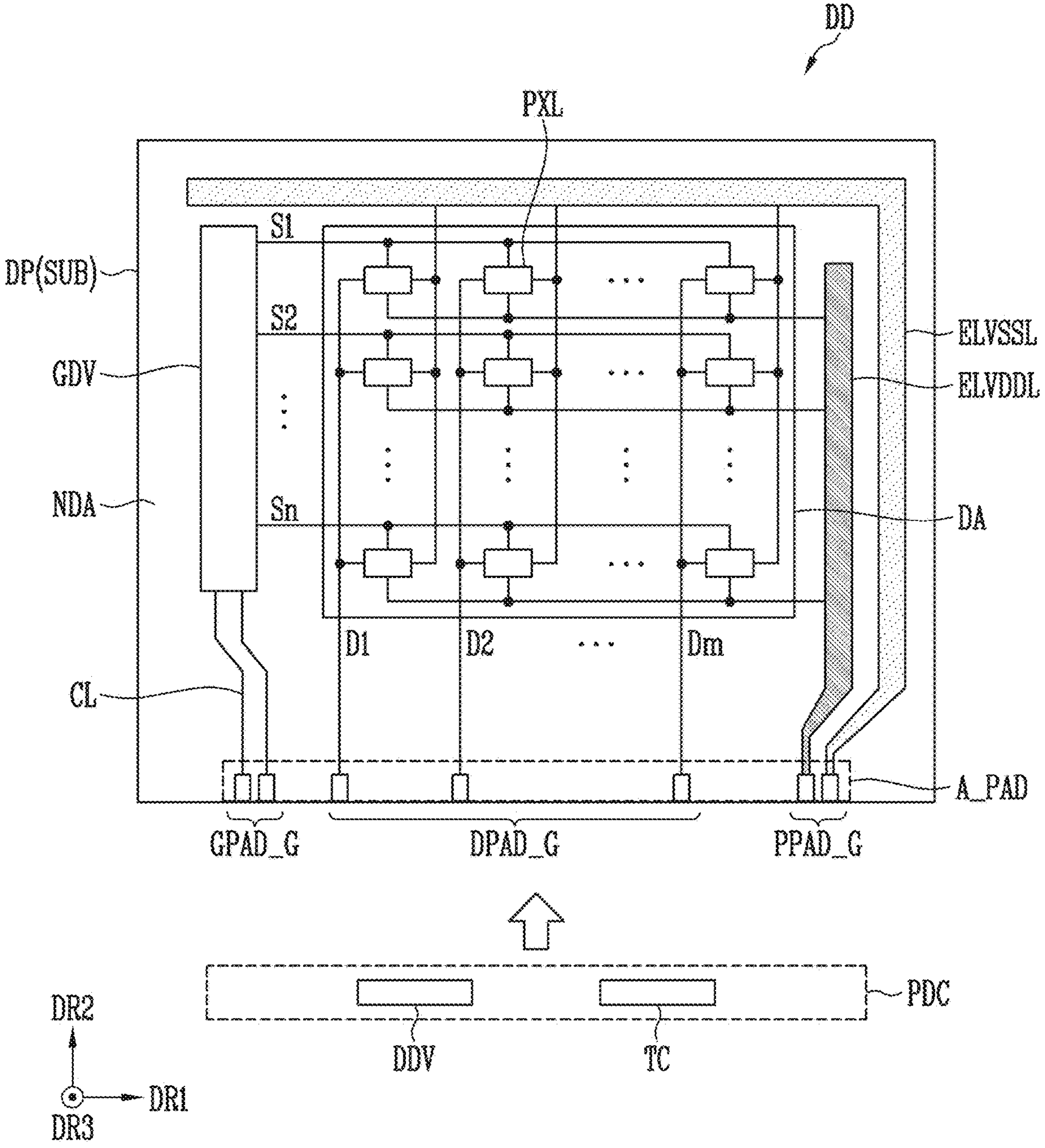
FIG. 1 is a schematic block diagram illustrating a display device according to embodiments of the disclosure.

Hereinafter, an embodiment according to the disclosure is described in detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiment described herein. However, the embodiment described herein is provided to describe in detail enough to easily implement the technical spirit of the disclosure to those skilled in the art to which the disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

FIG. 1 is a schematic block diagram illustrating a display device according to embodiments of the disclosure.

Referring to FIG. 1, the display device DD may include a display panel DP, a gate driver GDV (or a gate driving circuit GDV), a data driver DDV (or a data driving circuit DDV), and a timing control unit TC (or a timing controller circuit TC).

The display panel DP may include a substrate SUB. The substrate SUB (or the display panel DP) may include a display area DA that displays an image and a non-display area NDA around the display area DA (for example, an edge area of the display area DA). Pixels PXL may be disposed on the display panel DP. The gate driver GDV, gate pads GPAD_G, data pads DPAD_G, voltage pads PPAD_G, signal lines, and the like may be disposed in the non-display area NDA. The non-display area NDA may include a pad area A_PAD positioned on one side of the display area DA. The gate pads GPAD_G, the data pads DPAD_G, and the voltage pads PPAD_G may be disposed in the pad area A_PAD.

The display panel DP may include gate lines S1 to Sn (where n is a positive integer), data lines D1 to Dm (where m is a positive integer), gate pads GPAD_G, data pads DPAD_G, and voltage pads PPAD_G.

The gate lines S1 to Sn may extend lengthwise in a first direction DR1 and may be sequentially arranged along a second direction DR2 crossing the first direction. The data lines D1 to Dm may extend lengthwise in the second direction DR2 and may be sequentially arranged along the first direction DR1. Each of the pixels PXL may be connected to one of the gate lines S1 to Sn and one of the data lines D1 to Dm. The gate pads GPAD_G may be connected to control lines CL formed on the display panel DP and may transmit control signals (for example, gate driver control signals) supplied from an outside (for example, the timing controller TC) to the control lines CL. According to an embodiment, the gate pads GPAD_G may amplify the control signals (for example, the gate driver control signals) supplied from the outside and transmit the amplified control signals to the control lines CL.

The gate pads GPAD_G may be configured to transmit the control signals (for example, the gate driver control signals) to the gate driver GDV through the control lines CL. The gate driver control signals may include a start signal (or a start pulse), clock signals, and the like. The gate driver control signals may be provided from the timing controller TC.

The data pads DPAD_G may be configured to transmit data signals (or data voltages) to the data lines D1 to Dm. The data signals may be provided from the data driver DDV. According to an embodiment, the data signals (or the data voltages) may be amplified in the data pads DPAD_G.

The power pads PPAD_G may transmit a first power voltage ELVDD to the pixels PXL through a first power line ELVDDL. The power pads PAD_P may transmit a second power voltage ELVSS to the pixels PXL through a second power line ELVSSL. The first power voltage ELVDD and the second power voltage ELVSS may be power voltages required for an operation of the pixels PXL, and may be provided from a power supply (not shown). The first power voltage ELVDD may have a voltage level higher than a voltage level of the second power voltage ELVSS.

The gate driver GDV may generate gate signals based on the gate driver control signals and provide the gate signals to the gate lines S1 to Sn.

The gate driver GDV may include an emission driver (not shown).

According to an embodiment, the gate driver GDV may be integrated with the pixels PXL and formed on the display panel DP. However, embodiments of the disclosure are not limited thereto. For example, the gate driver GDV may be implemented as an integrated circuit separate from the display panel DP and may be mounted on a panel driving circuit PDC. In FIG. 1, the gate driver GDV is shown as being disposed in the non-display area NDA, but embodiments of the disclosure are not limited thereto. In an embodiment, the gate driver GDV may be distributed in the display area DA (for example, between the pixels PXL). For example, the gate driver GDV may include sub-gate drivers distributed among the pixels PXL.

The data driver DDV may receive a data control signal and image data from the timing controller TC, and generate data signals (or data voltages) corresponding to the image data. The data driver DDV may provide the generated data signals to the display panel DP. For example, the data driver DDV may generate data signals corresponding to grayscale values in the image data, and supply the data signals to the data lines D1 to Dm through the data pads DPAD_G in a pixel row unit.

The data driver DDV may be mounted on the panel driving circuit PDC, may be connected to the timing controller TC, and may be connected to the data lines D1 to Dm through the data pads DPAD_G.

The timing controller TC may control the gate driver GDV and the data driver DDV. The timing controller TC may receive input image data (for example, RGB data) and external signals from an external device (for example, a graphic processor, a set-top box, or the like), generate control signals (for example, gate driver control signals, an emission driver control signal, and data driver control signals) based on the external signals, and generate the image data by converting the input image data. The external signals may include a vertical synchronization signal, a horizontal synchronization signal, a data enable signal, a reference clock signal, and the like. For example, the timing controller TC may convert the input image data into the image data having a format that matches a pixel arrangement in the display panel DP. The timing controller TC may be mounted on the panel driving circuit PDC.

In FIG. 1, the data driver DDV and the timing controller TC are shown as being implemented as separate integrated circuits, but embodiments of the disclosure are not limited thereto. For example, the data driver DDV and the timing controller TC may be implemented as one integrated circuit.

Figure 2:
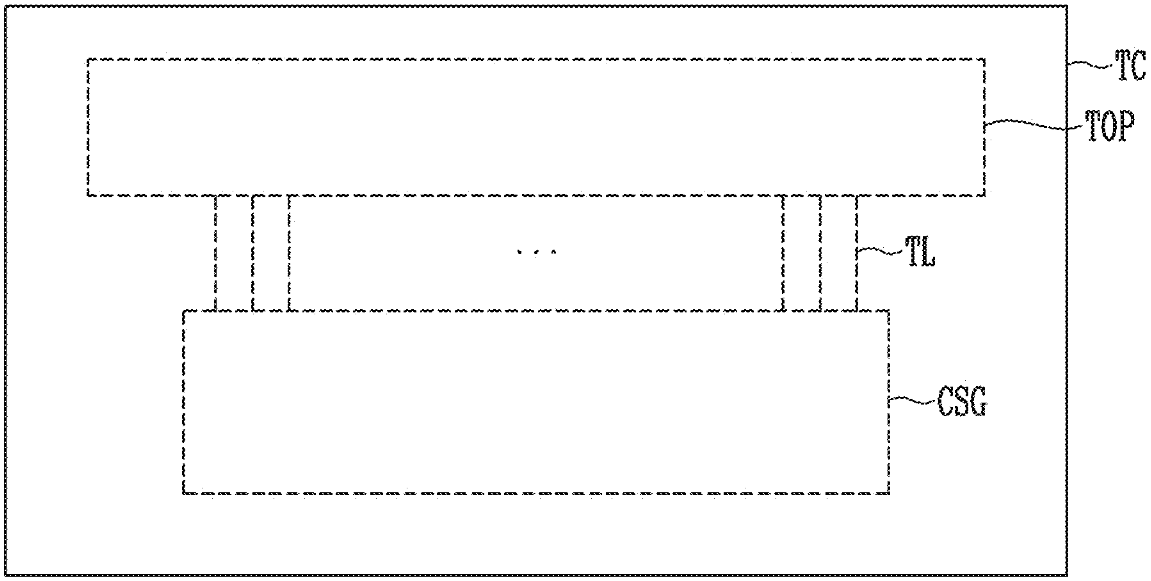
FIG. 2 is a schematic diagram illustrating a timing controller of FIG. 1.

FIG. 2 is a schematic diagram illustrating the timing controller of FIG. 1.

Referring to FIG. 2, the timing controller TC may include a control signal generator CSG (i.e., a control signal generator circuit), an output pad unit TOP, and transmission lines TL.

The control signal generator CSG may receive the input image data (for example, RGB data) and the external signals from an external device (for example, a graphic processor, a set-top box, or the like), generate control signals (for example, gate driver control signals, an emission driver control signal, and data driver control signals) based on the external signals, and generate the image data by converting the input image data. The external signals may include a vertical synchronization signal, a horizontal synchronization signal, a data enable signal, a reference clock signal, and the like. For example, the timing controller TC may convert the input image data into the image data having a format that matches a pixel arrangement in the display panel DP.

The control signal generator CSG may transmit the generated control signals (for example, the gate driver control signals and the emission driver control signals) to the output pad unit TOP through the transmission lines TL.

The output pad unit TOP may be arranged to be spaced apart from the control signal generator CSG in the second direction DR2.

The output pad unit TOP may include a plurality of pads having the same size and shape.

The pads of the output pad unit TOP may be configured to transmit the control signals (for example, the gate driver control signals and the emission driver control signals) generated from the control signal generator CSG to the gate pads GPAD_G. A disposition or the like of the pads of the output pad unit TOP is described later with reference to FIGS. 4 to 8.

The image data and the data driver control signals generated in the control signal generator CSG may be transmitted to the data driver DDV through separate pads (not shown).

Figure 3:
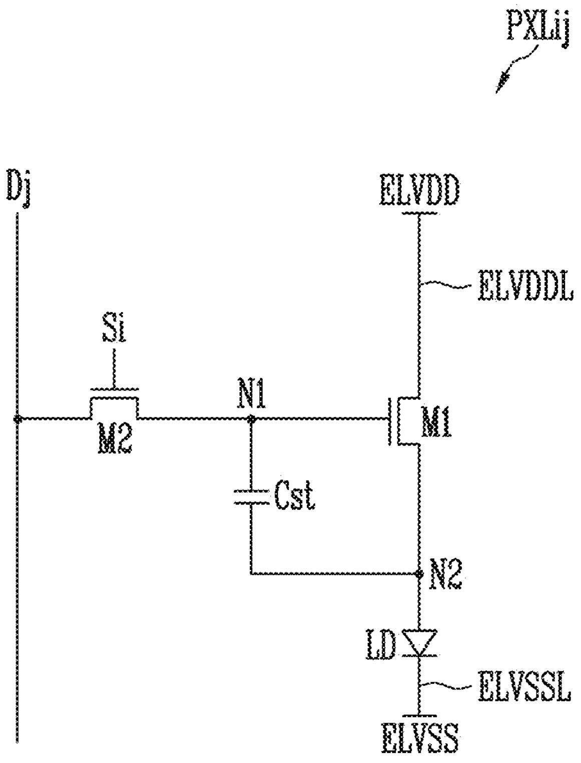
FIG. 3 is a circuit diagram illustrating an embodiment of one of pixels included in the display device of FIG. 1.

FIG. 3 is a schematic circuit diagram illustrating an embodiment of one of the pixels included in the display device of FIG. 1. The pixels PXL shown in FIG. 1 may be substantially equal to or similar to each other. For convenience of description, a pixel PXLij positioned in an i-th (i is an integer greater than or equal to 1 and less than or equal to n) pixel row and a j-th (j is an integer greater than or equal to 1 and less than or equal to m) pixel column is described.

Referring to FIGS. 1 and 3, the pixel PXLij may include a plurality of transistors, capacitors, and a light emitting element. For example, the pixel PXLij may include first and second transistors M1 and M2, a storage capacitor Cst, and the light emitting element LD.

Hereinafter, a case where the transistors M1 and M2 are configured as N-type transistors (for example, N-type Metal Oxide Semiconductor (NMOS) transistors), but those skilled in the art may configure the first and second transistors M1 and M2 as P-type transistors (for example, P-type Metal Oxide Semiconductor (PMOS) transistors) or a combination of an N-type transistor and a P-type transistor.

The first transistor M1 may have a gate electrode connected to a first node N1, a first electrode connected to a second node N2, and a second electrode may be connected to the first power line ELVDDL to which the first power voltage ELVDD is applied.

The second transistor M2 may have a gate electrode connected to the i-th gate line, a first electrode connected to the j-th data line Dj, and a second electrode connected to the first node N1. The second transistor M2 may be referred to as a switching transistor or the like.

The storage capacitor Cst may have a first electrode connected to the first node N1 and a second electrode connected to the second node N2.

The light emitting element LD may have an anode connected to the second node N2 and a cathode connected to the second power line ELVSSL to which the second power voltage ELVSS is applied. The light emitting element LD may be a light emitting diode. For example, the light emitting element LD may be an organic light emitting diode, an inorganic light emitting diode, a quantum dot light emitting diode, or the like.

In addition, although only one light emitting element LD is shown in FIG. 3, the light emitting element LD may be configured of a plurality of ultra-small light emitting elements. For example, the plurality of ultra-small light emitting elements may be connected in series, parallel, or series-parallel.

Figure 4:
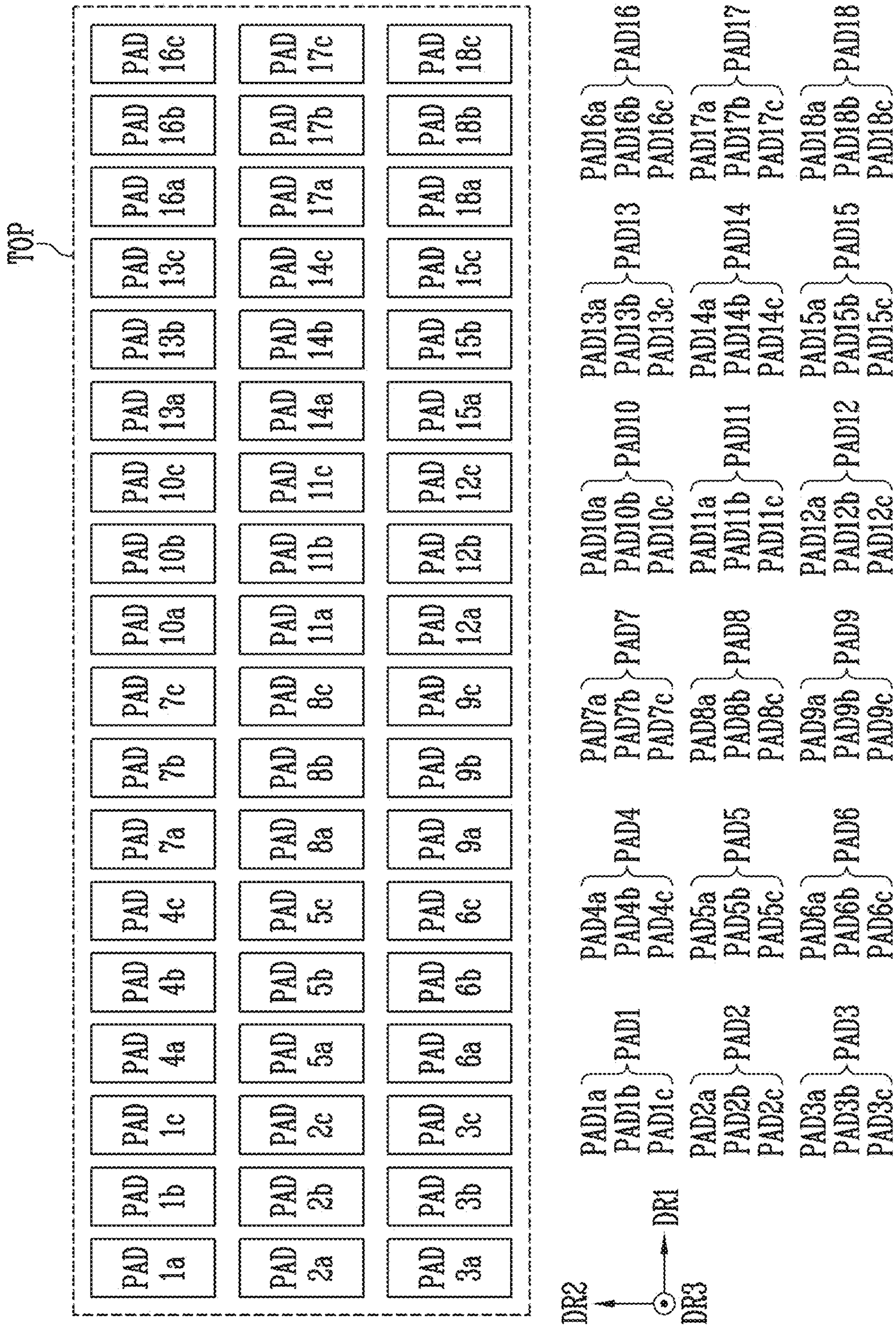
FIG. 4 is a schematic diagram illustrating an output pad unit of FIG. 1.

FIG. 4 is a schematic diagram illustrating the output pad unit of FIG. 1. The output pad unit may include a plurality of output pads arranged in a plurality of rows and a plurality of columns. Each of the plurality of rows may extend in the first direction DR1, and the plurality of rows may be spaced apart from each other in the second direction DR2. Each of the plurality of columns may extend in the second direction DR2, and the plurality of columns may be spaced apart from each other in the first direction DR1. The plurality of output pads may be grouped in the plurality of sub pad groups arranged in the plurality of rows and the plurality of columns. The plurality of sub pad groups may output different control signals, and each of the plurality of sub pad groups may serve to output a same control signal.

Referring to FIG. 4, the output pad unit TOP may include the plurality of sub pad groups. For example, the output pad unit TOP may include first to eighteenth sub pad groups GPAD1 to GPAD18. However, embodiments of the disclosure are not limited thereto. For example, the output pad unit TOP may include 18 or more sub pad groups. However, hereinafter, for the convenience of the description, the output pad unit TOP including 18 sub pad groups will be described.

Each of the sub pad groups may include a plurality of pads (i.e., output pads). For example, at least one of the sub pad groups may include P pads (P is an integer greater than or equal to 2). For example, the first sub pad group PAD1 may include 1a-th to 1c-th pads PAD1*a* to PAD1*c*. The second sub pad group PAD2 may include 2a-th to 2c-th pads PAD2*a* to PAD2*c*. The third sub pad group PAD3 may include 3a-th to 3c-th pads PAD3*a* to PAD3*c*. The fourth sub pad group PAD4 may include 4a-th to 4c-th pads PAD4*a* to PAD4*c*. The fifth sub pad group PAD5 may include 5a-th to 5c-th pads PAD5*a* to PAD5*c*. The sixth sub pad group PAD6 may include the 6a-th to 6c-th pads PAD6*a* to PAD6*c*. The seventh sub pad group PAD7 may include 7a-th to 7c-th pads PAD7*a* to PAD7*c*. The eighth sub pad group PAD8 may include 8a-th to 8c-th pads PAD8*a* to PAD8*c*. The ninth sub pad group PAD9 may include 9a-th to 9c-th pads PAD9*a* to PAD9*c*. The tenth sub pad group PAD10 may include 10a-th to 10c-th pads PAD10*a* to PAD10*c*. The eleventh sub pad group PAD11 may include 11a-th to 11c-th pads PAD11*a* to PAD11*c*. The twelfth sub pad group PAD12 may include 12a-th to 12c-th pads PAD12*a* to PAD12*c*. The thirteenth sub pad group PAD13 may include 13a-th to 13c-th pads PAD13*a* to PAD13*c*. The fourteenth sub pad group PAD14 may include 14a-th to 14c-th pads PAD14*a* to PAD14*c*. The fifteenth sub pad group PAD15 may include 15a-th to 15c-th pads PAD15*a* to PAD15*c*. The sixteenth sub pad group PAD16 may include 16a-th to 16c-th pads PAD16*a* to PAD16*c*. The seventeenth sub pad group PAD17 may include 17a-th to 17c-th pads PAD17*a* to PAD17*c*. The eighteenth sub pad group PAD18 may include 18a-th to 18c-th pads PAD18*a* to PAD18*c*.

Pads included in each of the first to eighteenth sub pad groups PAD1 to PAD18 may be spaced apart from each other in the first direction and arranged side by side (or adjacent to each other). For example, in the first sub pad group PAD1, the 1a-th pad PAD1*a* may be disposed adjacent to the 1b-th pad PAD1*b* in a direction opposite to the first direction DR1, and the 1c-th pad PAD1*c* may be disposed adjacent to the 1b-th pad PAD1*b* in the first direction DR1. In an embodiment, the first sub pad group PAD1 may be consisted of three pads such as the 1a-th pad PAD1*a*, the 1b-th pad PAD1*b*, and the 1c-th pad PAD1*c* which are arranged side by side in first direction DR1. The 1b-th pad PAD1*b* may be disposed in a space between the 1a-th pad PAD1*a* and the 1c-th pad PAD1*c*. For example, in the second sub pad group PAD2, the 2a-th pad PAD2*a* may be disposed adjacent to the 2b-th pad PAD2*b* in the direction opposite to the first direction DR1, and the 2c-th pad PAD2*c* may be disposed adjacent to the 2b-th pad PAD2*b* in the first direction DR1. In an embodiment, the second sub pad group PAD2 may be spaced apart from the first sub pad group PAD1 in the second direction DR2, and may be consisted of three pads such as the 2a-th pad PAD2*a*, the 2b-th pad PAD2*b*, and the 2c-th pad PAD2*c* which are arranged side by side in first direction DR1. The 2b-th pad PAD2*b* may be disposed in a space between the 2a-th pad PAD2*a* and the 2c-th pad PAD2*c*.

A disposition form of the pads PAD1*a* to PAD18*c* configuring the output pad unit TOP may be as follows.

The second sub pad group PAD2 may be disposed adjacent to the first sub pad group PAD1 in the second direction DR2. The third sub pad group PAD3 may be disposed adjacent to the second sub pad group PAD2 in the second direction DR2. The fourth sub pad group PAD4 may be disposed adjacent to the first sub pad group PAD1 in the first direction DR1. The fifth sub pad group PAD5 may be disposed adjacent to the second sub pad group PAD2 in the first direction DR1. The sixth sub pad group PAD6 may be disposed adjacent to the third sub pad group PAD3 in the first direction DR1. The seventh sub pad group PAD7 may be disposed adjacent to the fourth sub pad group PAD4 in the first direction DR1. The eighth sub pad group PAD8 may be disposed adjacent to the fifth sub pad group PAD5 in the first direction DR1. The ninth sub pad group PAD9 may be disposed adjacent to the sixth sub pad group PAD6 in the first direction DR1. The tenth sub pad group PAD10 may be disposed adjacent to the seventh sub pad group PAD7 in the first direction DR1. The eleventh sub pad group PAD11 may be disposed adjacent to the eighth sub pad group PAD8 in the first direction DR1. The twelfth sub pad group PAD12 may be disposed adjacent to the ninth sub pad group PAD9 in the first direction DR1. The thirteenth sub pad group PAD13 may be disposed adjacent to the tenth sub pad group PAD10 in the first direction DR1. The fourteenth sub pad group PAD14 may be disposed adjacent to the eleventh sub pad group PAD11 in the first direction DR1. The fifteenth sub pad group PAD15 may be disposed adjacent to the twelfth sub pad group PAD12 in the first direction DR1. The sixteenth sub pad group PAD16 may be disposed adjacent to the thirteenth sub pad group PAD13 in the first direction DR1. The seventeenth sub pad group PAD17 may be disposed adjacent to the fourteenth sub pad group PAD14 in the first direction DR1. The eighteenth sub pad group PAD18 may be disposed adjacent to the fifteenth sub pad group PAD15 in the first direction DR1. When disposing the first to eighteenth sub pad groups PAD1 to PAD18 as described above, the pads included in the output pad unit TOP may be disposed in three rows extending in the first direction DR1 and spaced apart from each other in the second direction DR2.

The first to eighteenth sub pad groups GPAD1 to GPAD18 may transmit different control signals (for example, the gate driver control signals) to the gate pads GPAD_G through the transmission lines. For example, the 1a-th to 1c-th pads PAD1*a* to PAD1*c* included in the first sub pad group PAD1 may transmit a first gate driver control signal among the gate driver control signals to one of the gate pads GPAD_G. In an embodiment, the 1a-th to 1c-th pads PAD1*a* to PAD1*c* of the first sub pad group PAD1 may be connected with each other, and may serve to transmit the first gate driver control signal to a first gate pad of the gate pads GPAD_G.

The 2a-th to 2c-th pads PAD2*a* to PAD2*c* included in the second sub pad group PAD2 may transmit a second gate driver control signal among the gate driver control signals to one of the gate pads GPAD_G. In an embodiment, the 2a-th to 2c-th pads PAD2*a* to PAD2*c* of the second sub pad group PAD2 may be connected with each other, and may serve to transmit the second gate driver control signal to a second gate of the gate pads GPAD_G. At this time, the first gate driver control signal and the second gate driver control signal may be different from each other, and the first gate pad may be different from the second gate pad.

Figure 5:
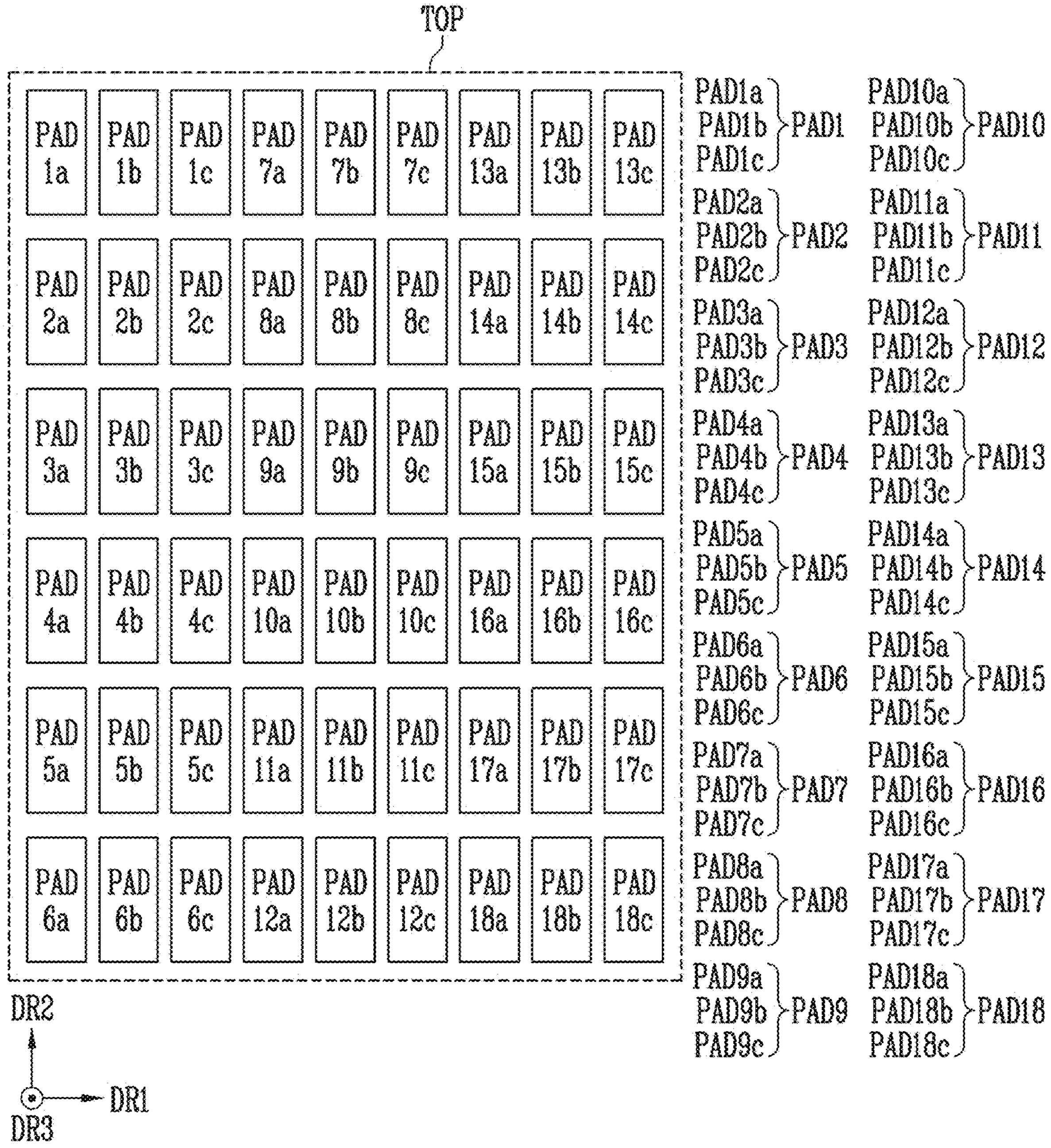
FIG. 5 is a schematic diagram illustrating the output pad unit of FIG. 1 according to another embodiment.

FIG. 5 is a schematic diagram illustrating the output pad unit of FIG. 1 according to an embodiment.

Referring to FIG. 5, a content overlapping the description of the first to eighteenth sub pad groups PAD1 to PAD18 with reference to FIG. 4 is omitted below.

A specific disposition form of the pads PAD1*a* to PAD18*c* configuring the output pad unit TOP may be as follows.

The second sub pad group PAD2 may be disposed adjacent to the first sub pad group PAD1 in the second direction DR2. The third sub pad group PAD3 may be disposed adjacent to the second sub pad group PAD2 in the second direction DR2. The fourth sub pad group PAD4 may be disposed adjacent to the third sub pad group PAD3 in the second direction DR2. The fifth sub pad group PAD5 may be disposed adjacent to the fourth sub pad group PAD4 in the second direction DR2. The sixth sub pad group PAD6 may be disposed adjacent to the fifth sub pad group PAD5 in the second direction DR2. The seventh sub pad group PAD7 may be disposed adjacent to the first sub pad group PAD1 in the first direction DR1. The eighth sub pad group PAD8 may be disposed adjacent to the second sub pad group PAD2 in the first direction DR1. The ninth sub pad group PAD9 may be disposed adjacent to the third sub pad group PAD3 in the first direction DR1. The tenth sub pad group PAD10 may be disposed adjacent to the fourth sub pad group PAD4 in the first direction DR1. The eleventh sub pad group PAD11 may be disposed adjacent to the fifth sub pad group PAD5 in the first direction DR1. The twelfth sub pad group PAD12 may be disposed adjacent to the sixth sub pad group PAD6 in the first direction DR1. The thirteenth sub pad group PAD13 may be disposed adjacent to the seventh sub pad group PAD7 in the first direction DR1. The fourteenth sub pad group PAD14 may be disposed adjacent to the eighth sub pad group PAD8 in the first direction DR1. The fifteenth sub pad group PAD15 may be disposed adjacent to the ninth sub pad group PAD9 in the first direction DR1. The sixteenth sub pad group PAD16 may be disposed adjacent to the tenth sub pad group PAD10 in the first direction DR1. The seventeenth sub pad group PAD17 may be disposed adjacent to the eleventh sub pad group PAD1 in the first direction DR1. The eighteenth sub pad group PAD18 may be disposed adjacent to the twelfth sub pad group PAD12 in the first direction DR1.

However, an embodiment of the disclosure is not limited thereto. The first to eighteenth sub pad groups PAD1 to PAD18 may be disposed in various rows and columns different from the form shown in FIGS. 4 and 5.

Figure 6:
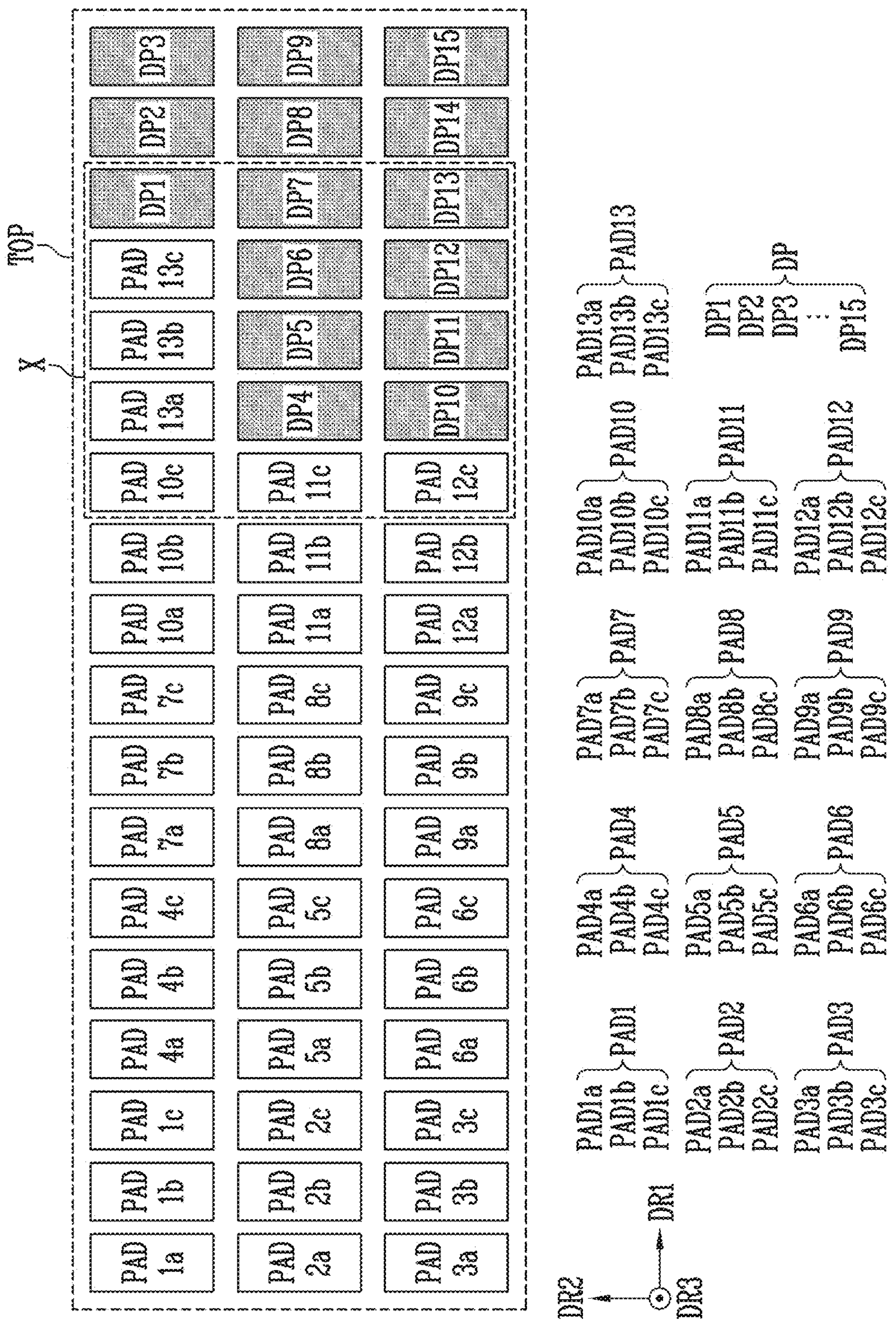
FIG. 6 is a schematic diagram illustrating the output pad unit of FIG. 1 according to still another embodiment.

FIG. 6 is a diagram illustrating the output pad unit of FIG. 1 according to an embodiment.

Referring to FIG. 6, the output pad unit TOP may include a plurality of sub pad groups and dummy pads. For example, the output pad unit TOP may include first to thirteenth sub pad groups PAD1 to PAD13 and first to fifteenth dummy pads DP1 to DP15. A content overlapping the description of the first to thirteenth sub pad groups PAD1 to PAD13 with reference to FIG. 4 is omitted below.

Pads included in the first to thirteenth sub pad groups PAD1 to PAD13 may be pads receiving the gate driver control signal from the timing controller TC. On the other hand, the dummy pads DP1 to DP15 may be pads that do not receive any signal from the timing controller TC. As used herein, the term "dummy" is used to refer to a pad that has the same or similar structure and shape as pads of each of the first to thirteenth sub pad groups PAD1 to PAD13 but does not have a substantial function and exists only as a pattern in the output pad unit TOP.

In FIG. 6, gate pads included in the fourteenth to eighteenth sub pad groups PAD14 to PAD18 among the first to eighteenth sub pad groups PAD1 to PAD18 (refer to FIG. 4) serve as the dummy pads, but the disclosure is not necessarily limited thereto. According to a product, the number and a disposition position of the dummy pads may vary.

Figure 7:
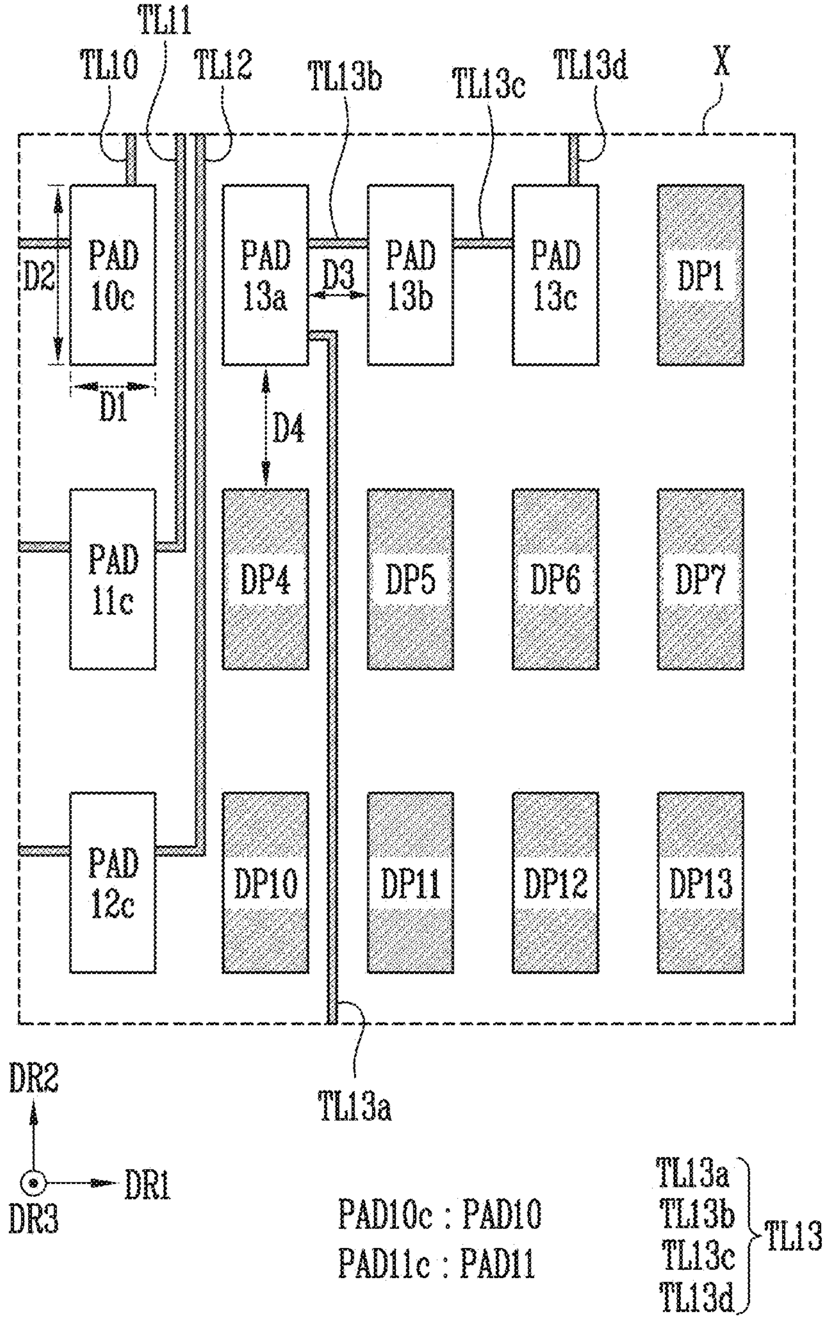
FIG. 7 is an enlarged view of a portion X of FIG. 6.

FIG. 7 is an enlarged view of a portion X of FIG. 6.

Referring to FIGS. 6 and 7, each of the pads PAD1*a* to PAD13*c* may have a width equal to a first length D1 in the first direction DR1. In addition, each of the pads PAD1*a* to PAD13*c* may have a width equal to a second length D2 in the second direction DR2. For example, the 10a-th pad PAD10*a* may have the width equal to the first length L1 in the first direction DR1 and the width equal to the second length L2 in the second direction DR2.

Pads adjacent to each other in the first direction DR1 may be spaced apart from each other by a third length L3. For example, the 10a-th pad PAD10*a* and the 13a-th pad PAD13*a* may be spaced apart by a third length L3. For example, the 13a-th pad PAD13*a* and the 13b-th pad PAD13*b* may be spaced apart from each other by the third length L3.

Pads adjacent to each other in the second direction DR2 may be spaced apart from each other by a fourth length L4. For example, the 11c-th pad PAD11*c* and the 12c-th pad PAD12*c* may be spaced apart from each other by the fourth length L4. The fourth dummy pad DP4 and the 13a-th pad PAD13*a* may be spaced apart from each other by the fourth length L4.

A distance between pads adjacent in the second direction DR2 may be formed to be wider than a distance between pads adjacent in the first direction DR1. In other words, a size of the fourth length L4 may be greater than a size of the third length L3. Accordingly, an influence of an electric field due to a voltage difference between the pads adjacent in the second direction DR2 may be less than an influence of an electric field due to a voltage difference between the pads adjacent to the first direction DR1.

A width of the first direction DR1 of each of the pads may be less than a width of the second direction DR2 of each of the pads. In other words, a size of the first length L1 may be less than a size of the second length L2. The area where the pads adjacent in the second direction DR2 face each other may be less than the area where the pads adjacent in the first direction DR1 face each other. Accordingly, the influence of the electric field due to the voltage difference between the pads adjacent in the second direction DR2 may be less than the influence of the electric field due to the voltage difference between the pads adjacent to the first direction DR1.

The transmission line may include a first portion, a second portion, and a third portion. The first portion of the transmission line may connect between the control signal generator CSG (refer to FIG. 2) and one pad included in the sub pad group. The second portion of the transmission line may connect the pads included in the sub pad group. The third portion of the transmission line may connect between one pad included in the sub pad group and one gate pad of the gate pads GPAD_G. For example, a first portion TL13*a* of a thirteenth transmission line TL13 may connect the control signal generator CSG to the 13a-th pad PAD13*a*. Second portions TL13*b* and TL13*c* of the thirteenth transmission line TL13 may connect the 13a-th to 13c-th pads PAD13*a* to PAD13*c*. For example, the second portion TL13*b* may connect the 13a-th pad PAD13*a* to the 13b-th pad PAD13*b*, and the second portion TL13*c* may connect the 13b-th pad PAD13*b* to the 13c-th pad PAD13*c*. A third portion TL13*d* of the thirteenth transmission line TL13 may connect the 13d-th pad PAD13*d* to one of the gate pads GPAD_G.

Each sub pad group may be connected to the gate pads GPAD_G through different transmission lines. For example, referring to FIG. 7, the tenth sub pad group PAD10 including the 10c-th pad PAD10*c* may be connected to the gate pads GPAD_G through a tenth transmission line TL10. The eleventh sub pad group PAD11 including the 11c-th pad PAD11*c* may be connected to the gate pads GPAD_G through an eleventh transmission line TL11. The twelfth sub pad group PAD12 including the 12c-th pad PAD12*c* may be connected to the gate pads GPAD_G through a twelfth transmission line TL12. The thirteenth sub pad group PAD13 may be connected to the gate pads GPAD_G through the thirteenth transmission line TL13.

In addition, each of the control signals (for example, the gate driver control signals) may be transmitted to the gate pads GPAD_G through pads included in one of the pad groups. For example, a tenth gate signal may be transmitted to the gate pads GPAD_G through the 10a-th to 10c-th pads PAD10*a* to PAD10*c* included in the tenth sub pad group PAD10. An eleventh gate signal may be transmitted to the gate pads GPAD_G through the 11a-th to 11c-th pads PAD11*a* to PAD11*c* included in the eleventh sub pad group PAD11. A twelfth gate signal may be transmitted to the gate pads GPAD_G through the 12a-th to 12c-th pads PAD12*a* to PAD12*c* included in the twelfth sub pad group PAD12. A thirteenth gate signal may be transmitted to the gate pads GPAD_G through the 13a-th to 13c-th pads PAD13*a* to PAD13*c* included in the thirteenth sub pad group PAD13.

According to an embodiment, some of transmission lines connected to sub pad groups adjacent in the second direction DR2 may be formed in different layers and may overlap each other in the third direction DR3. For example, the eleventh transmission line TL11 and the twelfth transmission line TL12 may be formed in different layers and may overlap each other in the third direction DR3.

Figure 8:
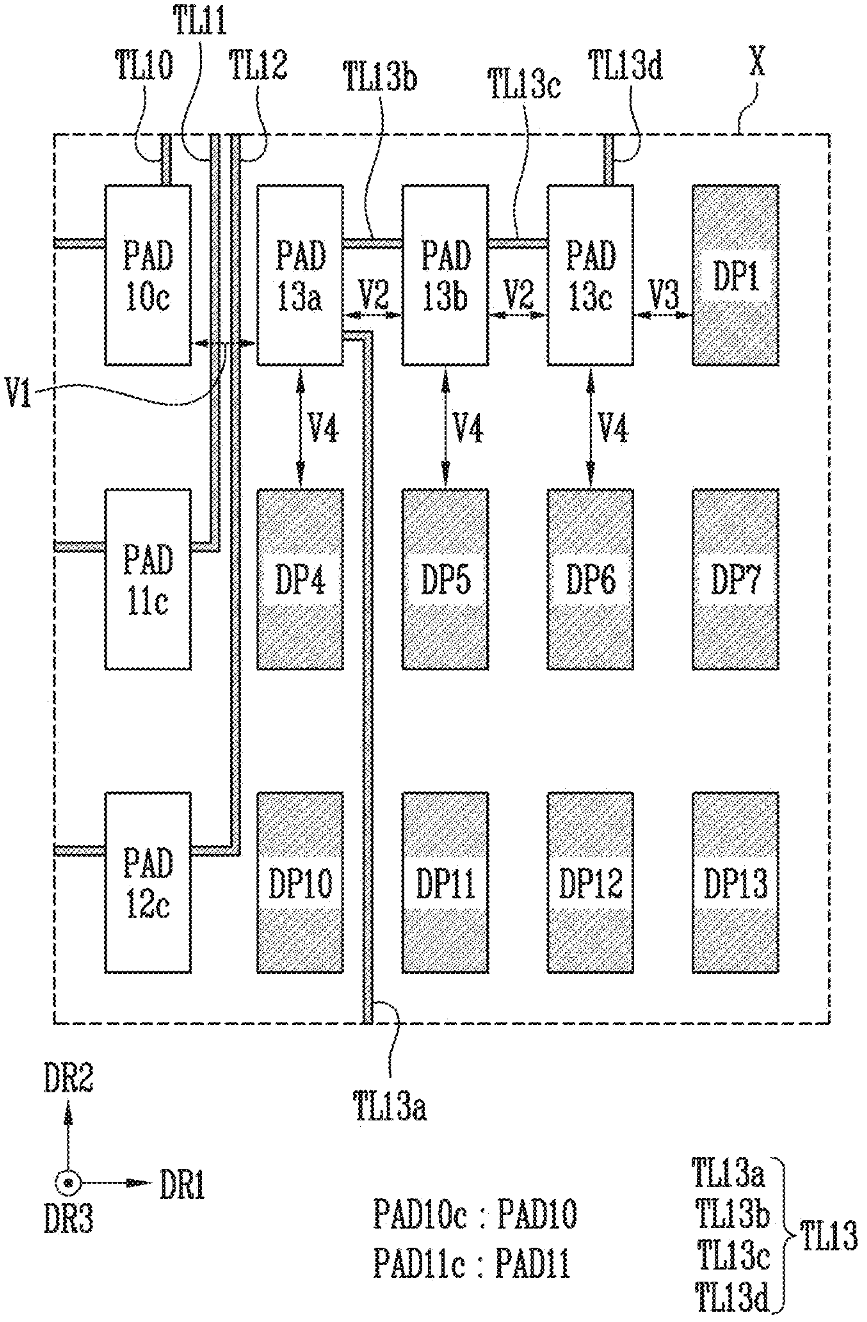
FIG. 8 is a diagram illustrating an embodiment of FIG. 7.

FIG. 8 is a diagram illustrating an embodiment of FIG. 7.

Referring to FIGS. 7 and 8, a voltage difference may be formed between different pads. For example, a first voltage difference V1 may be formed between the 13a-th pad PAD13*a* and the 10c-th pad PAD10*c* adjacent to each other in the first direction DR1. A second voltage difference V2 may be formed between the 13a-th pad PAD13*a* and the 13b-th pad PAD13*b* adjacent to each other in the first direction DR1. The second voltage difference V2 may be formed between the 13c-th pad PAD13*c* and the 13b-th pad PAD13*b* adjacent to each other in the first direction DR1. A third voltage difference V3 may be formed between the first dummy pad DP1 and the 13c-th pad PAD13*c* adjacent to each other in the first direction DR1. A fourth voltage difference V4 may be formed between the 13a-th pad PAD13*a* and the fourth dummy pad DP4 adjacent to each other in the second direction DR2. The fourth voltage difference V4 may be formed between the 13b-th pad PAD13*b* and the fifth dummy pad DP5 adjacent to each other in the second direction DR2. The fourth voltage difference V4 may be formed between the 13c-th pad PAD13*c* and the sixth dummy pad DP6 adjacent to each other in the second direction DR2.

Among the first to fourth voltage differences V1 to V4, the size of the second voltage difference V2 may be the smallest.

When the voltage difference between adjacent pads is large, a strong electric field may be generated between them, and thus a charge may move. Accordingly, corrosion of the pads may occur due to charge transfer. Since the corrosion occurring in the pads may cause a resistance increase, a disconnection, a short circuit, a bonding defect, or the like, the corrosion may be a reason that reduces reliability of the display device.

According to an embodiment of the disclosure, a distance between pads adjacent in the second direction DR2 may be formed to be wider than a distance between pads adjacent in the first direction DR1. Accordingly, the influence of the electric field due to the voltage difference between the pads adjacent in the second direction DR2 may be less than the influence of the electric field due to the voltage difference between the pads adjacent in the first direction DR1. For example, a size of the fourth length D4 (refer to FIG. 6) between the 13a-th pad PAD13*a* and the fourth dummy pad DP4 may be greater than a size of the third length D3 (refer to FIG. 6) between the 13a-th pad PAD13*a* and the 10c-th pad PAD10*c*. Accordingly, an influence of an electric field between the 13a-th pad PAD13*a* and the fourth dummy pad DP4 may be less than an influence of an electric field between the 13a-th pad PAD13*a* and the 10c-th pad PAD10*c*.

In addition, according to an embodiment of the disclosure, a pad disposed at a center among the pads included in one sub pad group may not be affected by the electric field generated by the pads adjacent in the first direction DR1. For example, an electric field due to the second voltage difference V2 may occur between the 13b-th pad PAD13*b* and the 13a-th pad PAD13*a* among the pads included in the thirteenth sub pad group PAD13. In addition, an electric field due to the second voltage difference V2 may occur between the 13b-th pad PAD13*b* and the 13c-th pad PAD13*c*. A magnitude of the electric fields generated between the 13b-th pad PAD13*b* and each of the pads PAD13*a* and PAD13*c* adjacent in the first direction DR1 may be substantially the same, and directions of the electric fields generated between the 13b-th pad PAD13*b* and each of the pads adjacent PAD13*a* and PAD13*c* in the first direction DR1 may be opposite to each other. Therefore, when considering and summing the magnitude and the direction of the formed electric fields, the electric fields applied to the 13b-th pad PAD13*b* may be cancelled out, thereby not being substantially affected by the electric fields from the pads adjacent in the first direction DR1.

According to an embodiment of the disclosure, as the influence of the electric field on the pads is substantially minimized, corrosion occurring in the pads may be alleviated. In addition, as the corrosion occurring in the pads is alleviated, a resistance increase, a disconnection, a short circuit, a bonding defect, or the like in the pads may be substantially prevented, and reliability of the display device may be improved.

Figure 9:
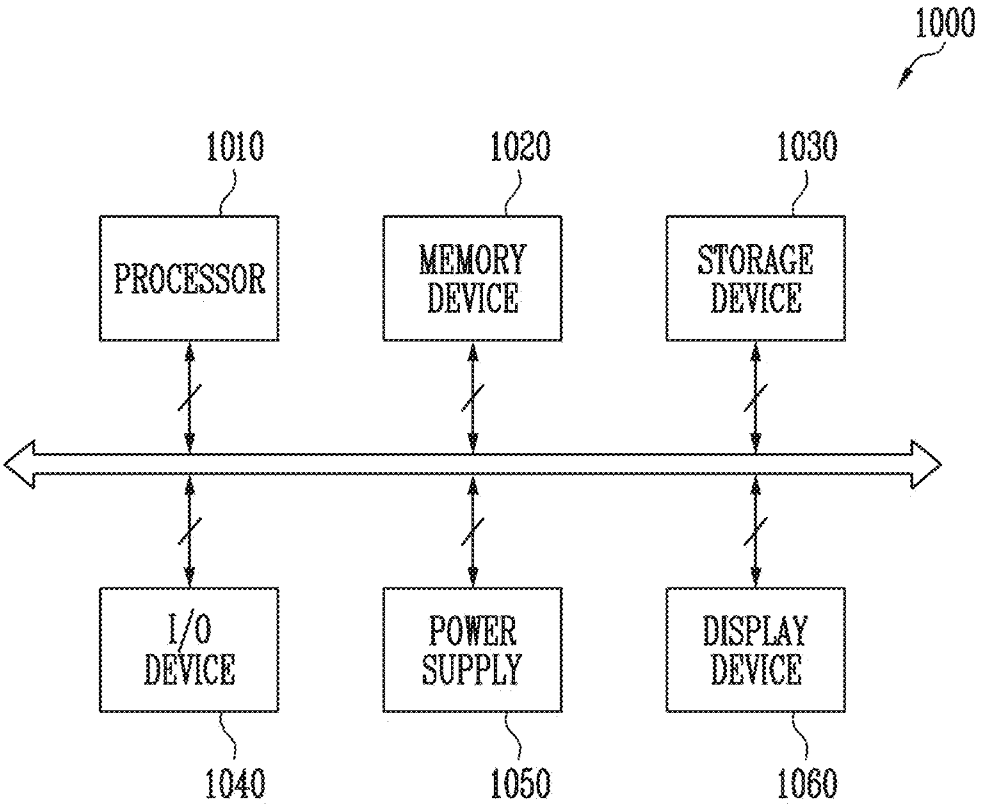
FIG. 9 is a block diagram illustrating an electronic device according to embodiments of the disclosure.
Figure 10:
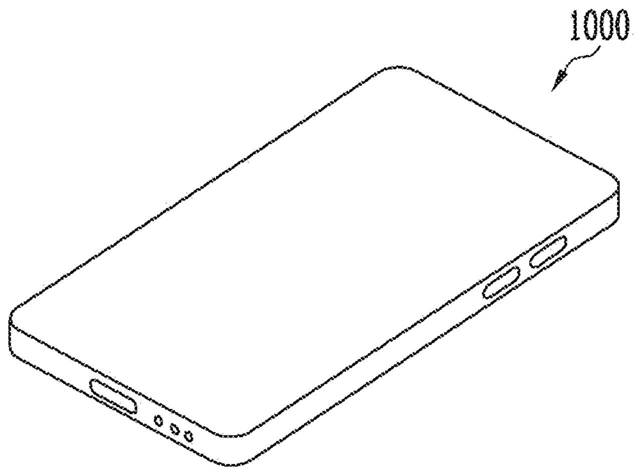
FIG. 10 is a diagram illustrating an example in which the electronic device of FIG. 9 is implemented as a smartphone.

FIG. 9 is a block diagram illustrating an electronic device according to embodiments of the disclosure, and FIG. 10 is a diagram illustrating an example in which the electronic device of FIG. 9 is implemented as a smartphone.

Referring to FIGS. 9 and 10, the electronic device 1000 may include a processor 1010, a memory device 1020, a storage device 1030, an input/output device 1040, a power supply 1050, and a display device 1060. The display device 1060 may be the display device of FIG. 1. The electronic device 1000 may further include several ports capable of communicating with a video card, a sound card, a memory card, a USB device, or the like, or communicating with other systems. In an embodiment, as shown in FIG. 10, the electronic device 1000 may be implemented as a smart phone. However, this is an exemplary, and the electronic device 1000 is not limited thereto. For example, the electronic device 1000 may be implemented as a mobile phone, a video phone, a smart pad, a smart watch, a tablet PC, a vehicle navigation device, a computer monitor, a notebook computer, a head mounted display device, or the like.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, or the like. According to an embodiment, the processor 1010 may also be connected to an expansion bus such as a peripheral component interconnect (PCI) bus.

The memory device 1020 may store data necessary for an operation of the electronic device 1000. For example, the memory device 1020 may include a non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PORAM) device, a magnetic random access memory (MRAM), and a ferroelectric random access memory (FRAM) device, a volatile memory device such as a dynamic random access memory (DRAM) device, a static random access memory (SRAM) device, and a mobile DRAM device, and/or the like.

The storage device 1030 may include a solid state drive (SSD), a hard disk drive (HDD), a CD-ROM, and the like.

The input/output device 1040 may include an input means such as a keyboard, a keypad, a touch pad, a touch screen, and a mouse, and an output means such as a speaker and a printer. According to an embodiment, the display device 1060 may be included in the input/output device 1040.

The power supply 1050 may supply power necessary for an operation of the electronic device 1000. For example, the power supply 1050 may be a power management integrated circuit (PMIC).

The display device 1060 may display an image corresponding to visual information of the electronic device 1000. At this time, the display device 1060 may be an organic light emitting display device or a quantum dot light emitting display device, but is not limited thereto. The display device 1060 may be connected to other components through the buses or other communication links.

Although specific embodiments and application examples are described herein, other embodiments and variations may be derived from the above description. Therefore, the spirit of the disclosure is not limited to these embodiments, but extends to the scope of the claims set forth below, various obvious modifications, and equivalents.

What is claimed is:

1. A timing controller comprising:

a control signal generator that generates a plurality of control signals;

an output pad unit including a plurality of output pads for outputting the plurality of control signals to an outside of the timing controller; and a plurality of transmission lines connecting the output pad unit to the control signal generator, wherein the plurality of output pads are grouped into a plurality of sub pad groups and each of the plurality of sub pad groups includes P output pads, and wherein P represents a number of output pads in each of the plurality of sub pad groups and the P output pads are electrically connected in series with each other, wherein the P output pads are adjacent to each other in a first direction, and the output pad unit is spaced apart from the control signal generator in a second direction crossing the first direction.

2. The timing controller according to claim 1, wherein each of the plurality of output pads included in the output pad unit has a first length in the first direction and a second length in the second direction, wherein the second length is longer than the first length, wherein a center pad of each sub pad group is directly connected between two outer pads of that sub pad group.

3. The timing controller according to claim 1, wherein the plurality of output pads included in the output pad unit are arranged in a plurality of rows and a plurality of columns, wherein each of the plurality of rows extends in the first direction, and the plurality of rows are spaced apart from each other in the second direction, wherein each of the plurality of columns extends in the second direction, and the plurality of columns are spaced apart from each other in the first direction, wherein output pads in each of the plurality of rows are spaced apart from each other in the first direction by a third length, and wherein output pads in each of the plurality of columns are spaced apart from each other in the second direction by a fourth length longer than the third length.

4. The timing controller according to claim 1, wherein the output pad unit further includes a plurality of dummy pads that do not output the control signals to the outside, wherein each of the plurality of sub pad groups includes a second output pad disposed between a first output pad and a third output pad in the first direction, wherein the first, second, and third output pads are electrically connected to each other, wherein directions of electric fields generated between the second output pad and the first output pad and between the second output pad and the third output pad in the first direction are opposite to each other.

5. The timing controller according to claim 1, wherein each of the plurality of sub pad groups is connected to the control signal generator through a corresponding one of the plurality of transmission lines.

6. The timing controller according to claim 1, wherein the plurality of sub pad groups include a first sub pad group and a second sub pad group, wherein the first sub pad group and the second sub pad group are adjacent to each other in the second direction, wherein the plurality of transmission lines include a first transmission line connected to the first sub pad group and a second transmission line connected to the second sub pad group, and wherein at least a portion of the first transmission line overlaps the second transmission line in a third direction perpendicular to the first and second directions.

7. The timing controller according to claim 6, wherein the first sub pad group outputs a first control signal among the plurality of control signals to the outside of the timing controller through the first transmission line, wherein the second sub pad group outputs a second control signal among the plurality of control signals to the outside of the timing controller through the second transmission line, and wherein the second control signal is different from the first control signal.

8. A display device comprising:

a plurality of pixels connected to a plurality of gate lines;

a gate driver that supplies a plurality of gate signals to the plurality of pixels through the plurality of gate lines;

a plurality of gate pads that transmit a plurality of control signals to the gate driver through a plurality of control lines; and a timing controller that supplies the plurality of control signals to the plurality of gate pads, wherein the timing controller comprises:

a control signal generator that generates the plurality of control signals;

an output pad unit including a plurality of output pads for outputting the plurality of control signals to an outside of the timing controller; and a plurality of transmission lines connecting the output pad unit to the control signal generator, wherein the plurality of output pads are grouped into a plurality of sub pad groups and each of the plurality of sub pad groups includes P output pads, wherein P represents a number of output pads in each of the plurality of sub pad groups and the P output pads are electrically connected in series with each other, wherein the P output pads are adjacent to each other in a first direction, and the output pad unit is spaced apart from the control signal generator in a second direction crossing the first direction.

9. The display device according to claim 8, wherein each of the plurality of output pads included in the output pad unit has a first length in the first direction and a second length in the second direction, wherein the second length is longer than the first length, wherein a center pad of each sub pad group is directly connected between two outer pads of that sub pad group.

10. The display device according to claim 8, wherein the plurality of output pads included in the output pad unit are arranged in a plurality of rows and a plurality of columns, wherein each of the plurality of rows extends in the first direction, and the plurality of rows are spaced apart from each other in the second direction, wherein each of the plurality of columns extends in the second direction, and the plurality of rows are spaced apart from each other in the first direction, wherein output pads in each of the plurality of rows are spaced apart from each other in the first direction by a third length, and wherein output pads in each of the plurality of columns are spaced apart from each other in the second direction by a fourth length longer than the third length.

11. The display device according to claim 8, wherein the output pad unit further includes a plurality of dummy pads that do not output the control signals to the outside.

12. The display device according to claim 8, wherein each of the plurality of sub pad groups is connected to the control signal generator through a corresponding one of the plurality of transmission lines.

13. The display device according to claim 8, wherein the plurality of sub pad groups include a first sub pad group and a second sub pad group, wherein the first sub pad group and the second sub pad group are adjacent to each other in the second direction, wherein the plurality of transmission lines include a first transmission line connected to the first sub pad group and a second transmission line connected to the second sub pad group, and wherein at least a portion of the first transmission line overlaps the second transmission line in a third direction perpendicular to the first and second directions.

14. The display device according to claim 13, wherein the first sub pad group outputs a first control signal among the plurality of control signals to the outside of the timing controller through the first transmission line, wherein the second sub pad group outputs a second control signal among the control signals to the outside of the timing controller through the second transmission line, and wherein the second control signal is different from the first control signal.

15. An electronic device comprising a processor and a timing controller the timing controller comprising:

a control signal generator that supplies a plurality of control signals;

an output pad unit including a plurality of output pads grouped into a plurality of sub pad groups for outputting the plurality of control signals to an outside of the timing controller; and a plurality of transmission lines, each of the plurality of transmission lines connecting a corresponding one of the plurality of sub pad groups to the control signal generator, wherein the plurality of sub pad groups are arranged in a plurality of rows and a plurality of columns and each of the plurality of sub pad groups includes P output pads, wherein P represents a number of output pads in each of the plurality of sub pad groups and the P output pads are electrically connected in series with each other, wherein the P output pads are adjacent to each other in a first direction, and the output pad unit is spaced apart from the control signal generator in a second direction crossing the first direction, wherein each of the plurality of rows extends in the first direction, and the plurality of rows are spaced apart from each other in the second direction, and wherein each of the plurality of columns extend in the second direction, and the plurality of columns are spaced apart from each other in the first direction.

16. The electronic device of claim 15, wherein the P is three, wherein a center pad of each sub pad group is directly connected between two outer pads of that sub pad group.

17. The electronic device of claim 16, wherein each of the plurality of sub pad groups is consisted of a first output pad, a second output pad, and a third output pad that are spaced apart from each other in the first direction and connected with each other, and wherein the second output pad is disposed between the first output pad and the third output pad.

18. The electronic device of claim 17, wherein each of the plurality of transmission lines includes a first portion connected to a first output pad of a corresponding one of the plurality of sub pad groups, two second portions connecting the first output pad to the second output pad and the third output pad to the second output pad, respectively, and a third portion which is electrically connected to a gate pad of a display panel.

19. The electronic device of claim 15, wherein each of the plurality of output pads included in the output pad unit has a first length in the first direction and a second length in the second direction, and wherein the second length is longer than the first length.

20. The electronic device of claim 19, wherein output pads in each of the plurality of rows are spaced apart from each other in the first direction by a third length, and wherein output pads in each of the plurality of columns are spaced apart from each other in the second direction by a fourth length longer than the third length.

* * * * *